United States Patent [19]

Aske

[11] Patent Number: 5,058,430
[45] Date of Patent: Oct. 22, 1991

[54] SENSOR CAPSULE MOUNTING

[75] Inventor: Vernon H. Aske, Minneonka, Minn.

[73] Assignee: Honeywell Inc., Minneapolis, Minn.

[21] Appl. No.: 458,853

[22] Filed: Dec. 29, 1989

[51] Int. Cl.⁵ .............................................. G01P 15/08
[52] U.S. Cl. .......................................... 73/497; 73/514
[58] Field of Search ................. 73/517 B, 517 R, 514, 73/497

[56] References Cited

U.S. PATENT DOCUMENTS

| | | | |
|---|---|---|---|
| 4,400,979 | 8/1983 | Hanson et al. | 73/517 B |
| 4,414,848 | 11/1983 | Shuff | 73/497 |
| 4,488,445 | 12/1984 | Aske | 73/517 R |
| 4,498,342 | 2/1985 | Aske | 73/517 B |
| 4,592,234 | 6/1986 | Norling | 73/517 B |
| 4,697,455 | 10/1987 | Norling | 73/497 |
| 4,766,768 | 8/1988 | Norling et al. | 73/497 |
| 4,779,463 | 10/1988 | Woodruff | 73/517 R |

Primary Examiner—John E. Chapman
Attorney, Agent, or Firm—Robert A. Pajak

[57] ABSTRACT

An apparatus for effectively mounting a silicon sensor capsule within a stainless steel, or other similar material, housing of an accelerometer comprises an alignment pin and two flex pins. The alignment pin provides torsional stiffness, while the flex pins provide stiffness in a vertical plane. The apparatus is capable of being used within different housings having different temperature coefficients of expansion. The mounting pins maintain accurate alignment of the sensor capsule without inducing stress into the capsule. Such stress could easily cause bias or misalignment errors which are undesirable in navigation of aircraft or missiles, two common uses of accelerometers.

5 Claims, 2 Drawing Sheets

SENSOR CAPSULE MOUNTING

FIELD OF THE INVENTION

This invention relates to accelerometers. More particularly, the invention relates to means for mounting a silicon accelerometer sensor capsule to the housing of an accelerometer.

BACKGROUND OF THE INVENTION

An example of a prior art mounting means is described in U.S. Pat. No. 4,697,455. In this reference, a coil is mounted to a proof mass assembly by a mounting system that comprises at least three mounting means. Each mounting means has first and second ends and a resilient intermediate portion. This device has the first end of each mounting means connected to the coil and the second end is connected to the proof mass assembly. The intermediate portion provides a low resistance to radial movement between the coil and proof mass assembly but provides a high resistance to movement perpendicular to the radial direction. This invention teaches constructing the piece of the proof mass to which the intermediate portion is attached out of fused quartz like the base of the mounting system.

U.S. Pat. No. 4,400,979 teaches a flexure for hingedly or translationally connecting a force sensing element to a mounting base. The force sensing element, or force sensing transducer, can be used as an accelerometer. The flexure includes one or more recessed surfaces which are substantially coincident with the neutral bending plane of the flexure. An electrically conductive coating on the recessed surfaces of the flexure provides connection to components on the force sensitive element.

In U.S. Pat. No. 4,779,463, flexures are disclosed which support a pendulum assembly of a servo type accelerometer. This reference teaches a way of preventing the flexures from being placed in a state of compression when the pendulum is subjected to acceleration forces directed along the axis of the pendulum normal to the pivotal axis.

At least one pliant member used as a mounting means for high performance transducers, such as accelerometers, is disclosed in U.S. Pat. No. 4,592,234. According to this reference, a transducer assembly comprises a proof mass, including a mass element suspended from a support member and a stator means for supporting the proof mass. A mounting means mounts the proof mass with the stator. The pliant member(s) is (are) positioned to provide the mechanical connection between adjacent points on the proof mass and stator. The axis of pliancy between the proof mass and sector is such that it provides strain relief.

U.S. Pat. No. 4,414,848 teaches a magnetic suspension system which provides constraint for the proof mass in three degrees of freedom. An elastic suspension system provides constraint in three additional degrees of freedom for the proof mass. The elastic suspension is a fine filament array in the preferred embodiment.

These inventions, although they successfully mount a sensor capsule, do not deal with the problem of different temperature coefficients of the sensor and the housing to which the sensor is mounted. Previously known accelerometer sensors were not constructed of silicon, rather the sensors were constructed of a material such as titanium which had a temperature coefficient very close to that of the housing. Because silicon has a much lower temperature coefficient than does the housing material, a new method of mounting was necessary to overcome this problem.

An Integrated Silicon Accelerometer such as that disclosed in U.S. Pat. No. 4,498,342 is a precision instrument developed for applications such as aircraft or missile navigation. The teachings of commonly assigned U.S. Pat. Nos. 4,498,342 and 4,448,445 are hereby incorporated by reference.

SUMMARY OF THE INVENTION

An important part of an accelerometer is it's sensor capsule mounting. In the accelerometer of the present invention, the sensor capsule is capable of sensing stress in flexure members due to input acceleration. Through a rebalance mechanism, the flexures can be put into a nearly stress free condition.

The sensor capsule is mounted within the housing of the accelerometer. The present invention provides an effective means for mounting the capsule within the housing and maintaining accurate alignment without putting undesireable stress into the sensor capsule. The mounting means includes an alignment pin which provides a large torsional stiffness so that the natural frequency of said capsule about the pin is greater than 2000 Hertz. Two flex pins are also provided which provide stiffness in a vertical plane but allow flexibility in two horizontal directions. Unwanted stress can easily cause bias or misalignment errors, thereby throwing off aircraft or missile navigation.

An object of this invention is to provide a successful mounting means for a sensor capsule whose sensing element is made of silicon and has a much lower temperature coefficient than the housing to which the capsule is mounted.

Other objects, features and characteristics of the present invention as well as the functions of related elements of the invention will become apparent upon consideration of the following description and the appended claims with reference to the accompanying drawings, all of which form a part of this specification.

BRIEF DESCRIPTION OF THE DRAWINGS

The following Detailed Description of the Presently Preferred Exemplary Embodiment can be better understood with reference to the drawings in which.

DETAILED DESCRIPTION OF THE PREFERRED EMBODIMENT

Figure 1:
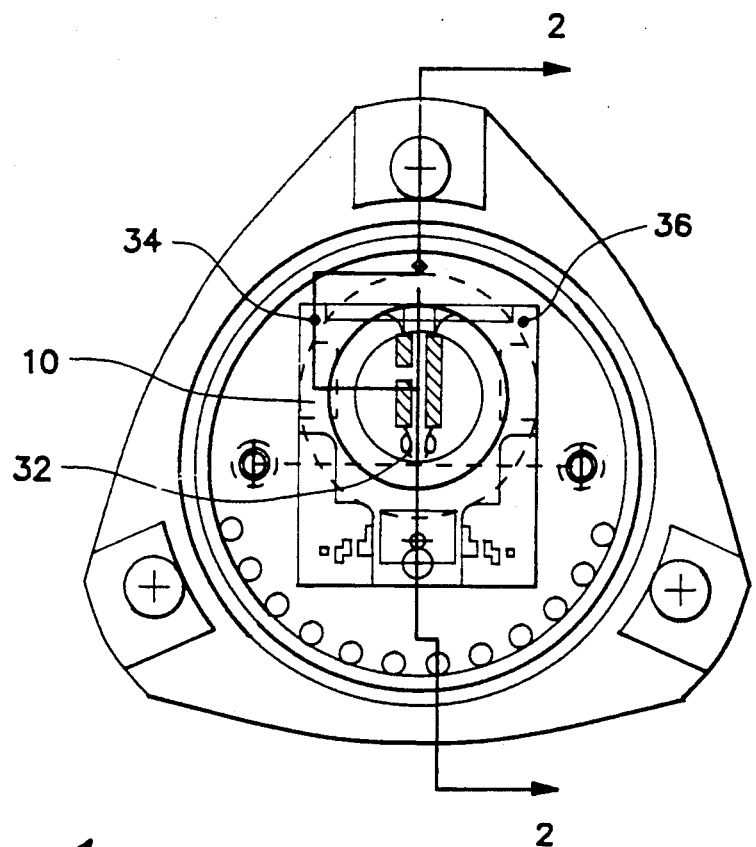
FIG. 1 is a top view of an accelerometer employing the sensor capsule mounting apparatus of the present invention.
Figure 2:
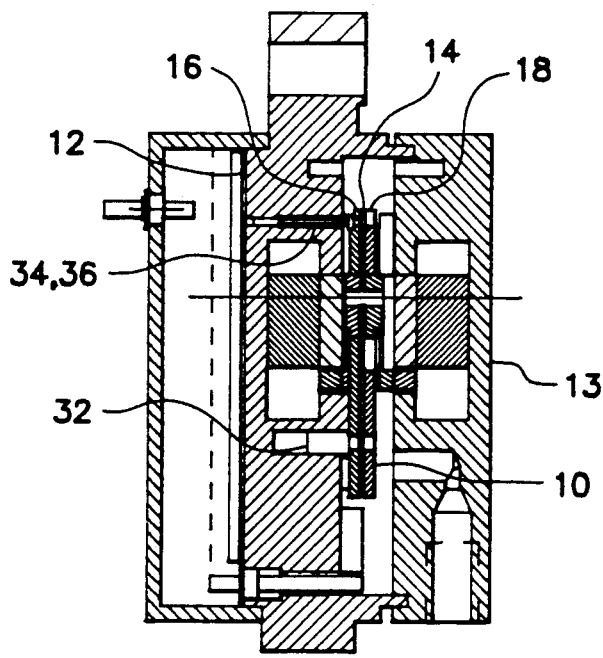
FIG. 2 is a cross-section taken along line "2—2" of FIG. 1.
Figure 3:
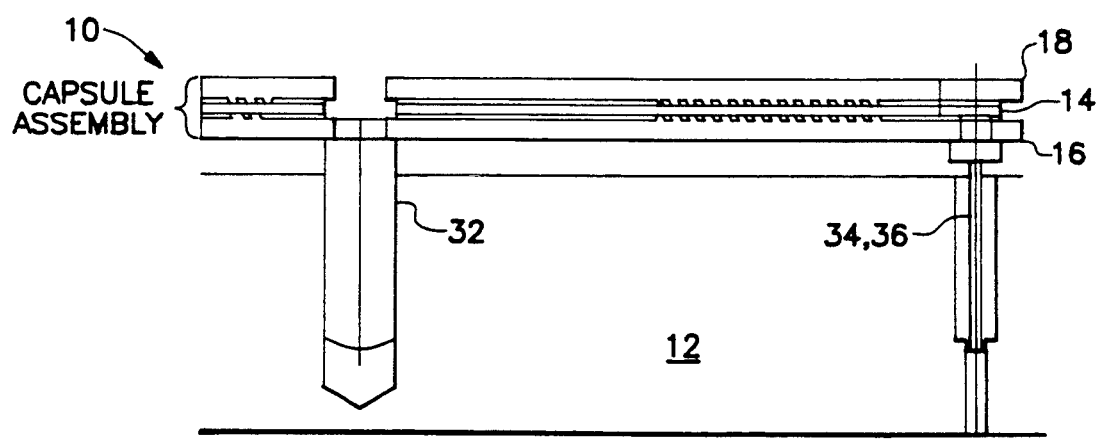
FIG. 3 is a detailed view of the alignment features of the present invention.

As shown in FIGS. 1 and 2, the sensor capsule 10 to be mounted into housing 12, 13 includes a silicon sensor die 14 and two silicon stops 16, 18. The sensor die 14 is able to sense stress in flexures caused by input acceleration and then rebalance the flexures through a rebalance mechanism to an essentially stress-free condition. The flexures can not be seen in the Figures as they are part of sensor die 14. A better view of the alignment features of the present invention can be seen in FIG. 3.

The housing 12, 13 to which sensor capsule 10 is mounted is preferably constructed from a material such as stainless steel. The housing has a top portion 13 and a bottom portion 12 which enclose the sensor capsule 10. The housing 12 has a temperature coefficient of approximately 5 to 6 microinch/inch/° F. and the silicon sensor capsule has a temperature coefficient of approximately 1 to 2 microinch/inch/° F. The sensor capsule 10 must be mounted within the housing 12 so as to maintain proper alignment without subjecting the capsule 10 to unnecessary stress that is capable of causing bias and misalignment errors. The means used to mount the sensor capsule 10 within housing 12 must also isolate capsule 10 from stresses caused by mounting in different materials, that is, the mounting means must be adaptable to different materials.

The mounting means, generally shown at 30, is comprised of an alignment pin 32 and two flex pins 34, 36. All three pins have shoulders which align to the bottom surface of the bottom silicon stop 16. This establishes alignment in a vertical plane. The alignment pin 32 is press fit into the housing and secured by epoxy or other means to the bottom stop 16. Alignment pin 32 and an alignment hole in bottom stop 16 accurately align the capsule 10 to a magnet gap in one plane while flex pins 34, 36 align the sensor capsule 10 in an orthogonal direction.

Alignment pin 32 is designed so as to provide large torsional stiffness so that the natural frequency of the capsule about the major axis of the alignment pin 32 is greater than 2000 Hertz. The flex pins 34, 36 provide necessary stiffness in the vertical plane but allow for some flex in the two horizontal planes. The alignment pin 32 and the flex pins 34, 36 are bonded to the bottom silicon stop to prevent the occurrence of any sheer stress in the sensor capsule 10. This arrangement permits the capsule 10 to expand or contract relative to the housing 12 while at the same time minimizing the stresses to the capsule 10.

While the invention has been described in connection with what is presently considered to be the most practical and preferred embodiment, it is to be understood that the invention is not to be limited to the disclosed embodiment, but, on the contrary, is intended to cover various modifications and equivalent arrangements included within the spirit and scope of the appended claims.

The embodiments of an invention in which an exclusive property or right is claimed are defined as follows:

1. A mounting means for a sensor capsule of a precision integrated silicon accelerometer comprising:
    a sensor capsule located in said accelerometer;
    an alignment pin for mounting said capsule and providing large torsional stiffness so that a natural frequency of said capsule about a major axis of said alignment is greater than 2000 Hertz; and
    two flex pins for mounting said capsule and providing stiffness in a vertical plane while allowing flexibility in two horizontal directions.

2. The apparatus as in claim 1 which further includes:
    silicon sensor die and means mounted in said sensor capsule for sensing stress in flexures in said die caused by input acceleration and rebalancing said flexures for a substantially stress free condition; and
    a top and a bottom silicon top for preventing overstress in said sensor die means.

3. The apparatus as in claim 2 wherein said alignment pin and said two flex pins have shoulders which align with a bottom surface of said bottom silicon stop so as to establish alignment in said vertical plane.

4. The apparatus as in claim 2 wherein said alignment pin and said two flex pins are bonded to said bottom silicon stop so as to avoid shear stress in said sensor capsule.

5. A mounting means for a sensor capsule whose sensing element is constructed of silicon, said mounting means comprising:
    an alignment pin for providing large torsional stiffness so that a natural frequency of said capsule about a major axis of said alignment pin is greater than 2000 Hertz; and
    two flex pins for providing stiffness in a vertical plane while allowing flexibility in two horizontal directions;
    wherein said mounting means is capable of mounting said sensor capsule to a housing having a different temperature coefficient of expansion without putting undesirable stress into said sensor capsule over a wide range of temperatures.

* * * * *

UNITED STATES PATENT AND TRADEMARK OFFICE
CERTIFICATE OF CORRECTION

PATENT NO. : 5,058,430
DATED : October 22, 1991
INVENTOR(S) : VERNON H. ASKE

It is certified that error appears in the above-identified patent and that said Letters Patent is hereby corrected as shown below:

Column 4, line 20, claim 2, delete "top" and insert --stop--.

Signed and Sealed this

Ninth Day of March, 1993

Attest:

STEPHEN G. KUNIN

Attesting Officer

Acting Commissioner of Patents and Trademarks